(12) United States Patent
Sonntag

(10) Patent No.: US 10,694,380 B2
(45) Date of Patent: Jun. 23, 2020

(54) SUBSCRIBER IDENTITY ELEMENT FOR AUTHENTICATING A COMMUNICATION DEVICE TO A COMMUNICATION NETWORK

(71) Applicant: Deutsche Telekom AG, Bonn (DE)

(72) Inventor: Thomas Sonntag, Wachtberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 55 days.

(21) Appl. No.: 16/097,857

(22) PCT Filed: Jul. 28, 2017

(86) PCT No.: PCT/EP2017/069146
§ 371 (c)(1),
(2) Date: Oct. 31, 2018

(87) PCT Pub. No.: WO2018/019986
PCT Pub. Date: Feb. 1, 2018

(65) Prior Publication Data
US 2019/0141530 A1    May 9, 2019

(30) Foreign Application Priority Data
Jul. 29, 2016    (EP) .................................... 16182096

(51) Int. Cl.
*H04W 12/06* (2009.01)
*H04L 29/06* (2006.01)
(Continued)

(52) U.S. Cl.
CPC ......... *H04W 12/06* (2013.01); *H04L 63/0853* (2013.01); *H04L 63/102* (2013.01);
(Continued)

(58) Field of Classification Search
None
See application file for complete search history.

(56) References Cited

U.S. PATENT DOCUMENTS

| 9,760,726 B2 * | 9/2017 | Berard ................. H04W 12/04 |
| 2003/0139180 A1 * | 7/2003 | McIntosh ............ H04L 63/0853 |
| | | 455/426.1 |

(Continued)

FOREIGN PATENT DOCUMENTS

EP    2680628 A1    1/2014

OTHER PUBLICATIONS

Anonymous: "3rd Generation Partnership Project; Technical Specification Group Services and System Aspects; Study on the security aspects of the next generation system (Release 14)", 3GPP TR 33.899 V0.5.0 (Oct. 2016, Jan. 2016 (Jan. 1, 2016), pp. 1-244, XP055479831.

(Continued)

*Primary Examiner* — Bunjob Jaroenchonwanit
(74) *Attorney, Agent, or Firm* — Leydig, Voit & Mayer, Ltd.

(57) ABSTRACT

A subscriber identity element authenticates a communication device to a communication network. The communication network comprises a subnetwork having a profile server. The subscriber identity element comprises: a memory in which an initialization profile of the subscriber identity element is stored, wherein the initialization profile indicates a subnetwork identifier of the subnetwork; and a communication interface, configured to establish a communication link to the profile server using the subnetwork identifier and to retrieve a subscriber profile from the profile server via the communication link.

16 Claims, 6 Drawing Sheets

(51) Int. Cl.
*H04W 8/24* (2009.01)
*H04W 12/04* (2009.01)
*H04W 12/00* (2009.01)
*H04W 76/11* (2018.01)
*H04W 92/10* (2009.01)

(52) U.S. Cl.
CPC ....... *H04W 8/245* (2013.01); *H04W 12/0023* (2019.01); *H04W 12/04* (2013.01); *H04W 76/11* (2018.02); *H04W 92/10* (2013.01)

(56) References Cited

U.S. PATENT DOCUMENTS

| | | | |
|---|---|---|---|
| 2006/0286847 A1* | 12/2006 | Zuo | H04B 1/3816 439/331 |
| 2009/0319641 A1* | 12/2009 | Verbandt | H04L 65/1016 709/220 |
| 2011/0212705 A1* | 9/2011 | Sprigg | H04M 3/42042 455/410 |
| 2012/0227093 A1* | 9/2012 | Shatzkamer | H04L 63/0892 726/4 |
| 2013/0097284 A1* | 4/2013 | Bai | H04L 9/3273 709/217 |
| 2014/0004827 A1* | 1/2014 | O'Leary | H04W 8/22 455/411 |
| 2014/0250347 A1* | 9/2014 | Grube | H04L 67/1097 714/770 |
| 2014/0379099 A1* | 12/2014 | Premereur | H02J 3/14 700/19 |
| 2016/0277940 A1* | 9/2016 | Waylett | H04W 88/10 |
| 2017/0156051 A1* | 6/2017 | Park | H04W 84/18 |
| 2017/0164212 A1* | 6/2017 | Opsenica | H04W 12/06 |
| 2017/0272939 A1* | 9/2017 | Milinski | H04L 61/2596 |
| 2017/0289791 A1* | 10/2017 | Yoo | H04W 60/04 |
| 2017/0325134 A1* | 11/2017 | Wan | H04B 1/3816 |
| 2017/0332421 A1* | 11/2017 | Sternberg | H04W 12/06 |
| 2018/0007172 A1* | 1/2018 | Wang | H04L 69/02 |
| 2018/0013680 A1* | 1/2018 | Bull | H04W 72/1268 |
| 2018/0048465 A1* | 2/2018 | Schliwa-Bertling | G11B 20/00695 |
| 2018/0152843 A1* | 5/2018 | Coughlin | H04W 12/06 |
| 2018/0227371 A1* | 8/2018 | Shatsky | H04L 65/104 |
| 2018/0359688 A1* | 12/2018 | An | H04W 76/10 |
| 2019/0037531 A1* | 1/2019 | Pantus | H04W 48/16 |
| 2019/0045335 A1* | 2/2019 | Jin | H04M 3/42076 |
| 2019/0110195 A1* | 4/2019 | Ito | H04L 9/08 |
| 2019/0124671 A1* | 4/2019 | Starsinic | H04W 12/06 |
| 2019/0141081 A1* | 5/2019 | Kunz | H04W 60/00 |
| 2019/0253962 A1* | 8/2019 | Kiessling | H04W 48/18 |
| 2019/0313443 A1* | 10/2019 | Li | H04W 74/004 |
| 2019/0335325 A1* | 10/2019 | Vagelos | H04W 12/0023 |

OTHER PUBLICATIONS

Huawei et al: "Adding authentication for remote provisioning", 3GPP Draft; S2-163526_Remote Provisioning General Solution-V10, 3$^{rd}$ Generation Partnership Project (3GPP), Mobile Competence Centre; 650, Route Des Lucioles; F-06921 Sophia-Antipolis Cedex; France, Bd. SA WG2, Nr. Vienna, Austria; Jul. 11-15, 2016, Jul. 10, 2016 (Jul. 10, 2016), XP051118118.

V1 Gsm Assication: "RSP Technical Specification Version 1.1", Jun. 9, 2016 (Jun. 9, 2016), pp. 1-125, XP055320845.

"3$^{rd}$ Generation Partnership Project; Technical Specification Group Services and System Aspects; Study on Architecture for Next Generation System (Release 14)", 3GPP Draft; 23799-060 RM, 3$^{rd}$ Generation Partnership Project (3GPP), Mobile Competence Centre; 650, Route Des Lucioles; F-06921 Sophia-Antipolis Cedex; France, Jul. 22, 2016 (Jul. 22, 2016), XP051138924.

NEC: "pCR to TR 33.899: Proposal of solution for key issue of network slicing security", 3GPP Draft; S3-160953 Slice_Security_Separation_NEC, 3$^{rd}$ Generation Partnership Project (3GPP), Mobile Competence Centre; 650, Route Des Lucioles, F-06921 Sophia-Antipolis Cedex; France, Bd. SA WG3, Nr. Chennai, India; Jul. 25-29, 2016, Jul. 24, 2016 (Jul. 24, 2016), XP051130834.

* cited by examiner

SUBSCRIBER IDENTITY ELEMENT FOR AUTHENTICATING A COMMUNICATION DEVICE TO A COMMUNICATION NETWORK

CROSS-REFERENCE TO RELATED APPLICATIONS

This application is a U.S. National Phase application under 35 U.S.C. § 371 of International Application No. PCT/EP2017/069146, filed on Jul. 28, 2017, and claims benefit to European Patent Application No. EP 16182096.4, filed on Jul. 29, 2016. The International Application was published in German on Feb. 1, 2018 as WO 2018/019986 A1 under PCT Article 21(2).

FIELD

The present invention relates to the field of communication technology, in particular the authenticating of a communication device to a communication network.

BACKGROUND

Subscriber identity elements are usually used for authenticating communication devices, for example mobile telephones, to a communication network. The subscriber identity elements are thereby configured to store data uniquely identifying the respective communication device.

With communication devices pursuant to the GSM standard (Global System for Mobile Communications), subscriber identity elements in the form of e.g. smart cards are used, which are also referred to as SIMs (Subscriber Identity Module). This includes for example an IMSI (International Mobile Subscriber Identity) which is assigned to a user of the communication device and is used to authenticate the communication device to the communication network.

Fifth-generation (5G) and further generation communication networks provide for subscriber identity elements to be fixedly integrated in the communication devices and for the respective data for identifying and authenticating to be provided via the communication network in the form of subscriber profiles.

SUMMARY

In an exemplary embodiment, the invention provides a subscriber identity element for authenticating a communication device to a communication network. The communication network comprises a subnetwork having a profile server. The subscriber identity element comprises: a memory in which an initialization profile of the subscriber identity element is stored, wherein the initialization profile indicates a subnetwork identifier of the subnetwork; and a communication interface, configured to establish a communication link to the profile server using the subnetwork identifier and to retrieve a subscriber profile from the profile server via the communication link.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
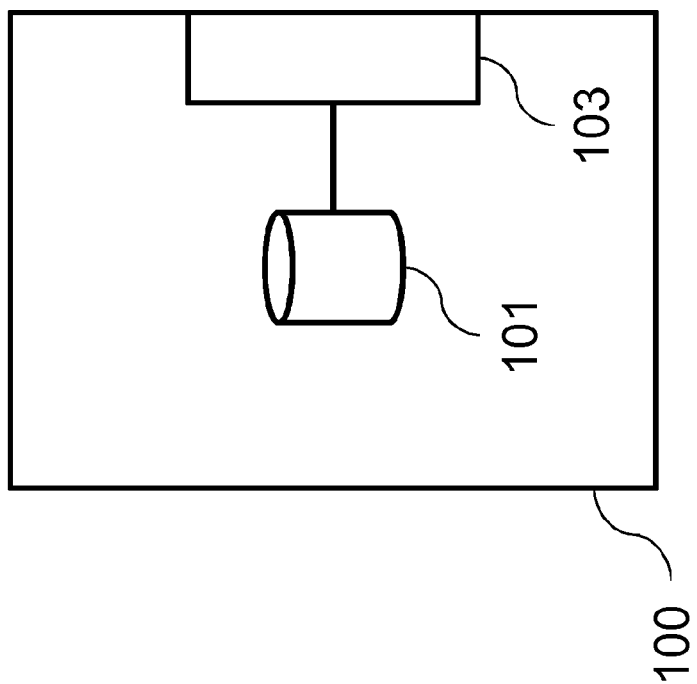
FIG. 1 is a schematic diagram of a subscriber identity element for authenticating a communication device to a communication network.

Exemplary embodiments of the present invention provide for efficiently initializing a subscriber identity element of a communication device.

Exemplary embodiments of the present invention provide a subscriber identity element which is able to communicate with a profile server of a communication network. The profile server is thereby assigned to a subnetwork of the communication network, whereby the profile server can be accessed using a subnetwork identifier of the subnetwork.

The subscriber identity element is configured to establish a communication link to the profile server using the subnetwork identifier and retrieve a subscriber profile from the profile server. The subscriber profile thereby comprises data which can be used to identify and authenticate the communication device to the communication network.

This thereby achieves a dedicated subnetwork being able to be provided with a profile server in order to assign a subscriber profile to a subscriber identity element. The subnetwork can, for example, be a slice of the communication network.

According to a first aspect, the invention relates to a subscriber identity element for authenticating a communication device to a communication network, whereby the communication network comprises a subnetwork having a profile server. The subscriber identity element has a memory in which an initialization profile of the subscriber identity element is stored, whereby the initialization profile indicates a subnetwork identifier of the subnetwork. The subscriber identity element further comprises a communication interface configured to establish a communication link to the profile server using the subnetwork identifier and to retrieve a subscriber profile from the profile server via the communication link. The subscriber identity element can be an eSIM (embedded SIM), a UICC (Universal Integrated Circuit Card) or an eUICC (embedded Universal Integrated Circuit Card).

According to one embodiment, the profile server is assigned a profile server identifier, whereby the initialization profile further indicates the profile server identifier, and whereby the communication interface is further configured to establish the communication link to the profile server using the profile server identifier.

According to one embodiment, the profile server identifier is a Uniform Resource Identifier (URI) of the profile server.

According to one embodiment, a subscriber identity identifier is assigned to the subscriber identity element, whereby the communication interface is configured to transmit the subscriber identity identifier to the profile server via the communication link. The subscriber identity identifier can be stored in the memory. The subscriber identity identifier can be an eID (eUICC-ID).

According to one embodiment, the memory is configured to store the subscriber profile. The subscriber profile can contain an IMSI (International Mobile Subscriber Identity).

According to one embodiment, the communication interface is further configured to establish the communication link to the profile server upon an initialization, in particular an initial initialization, of the subscriber identity element. The initialization profile can thus be used for the initializing of the subscriber identity element. The initialization profile can be a bootstrap profile.

According to one embodiment, the communication network is a communication network of the fifth generation (5G) or a further generation, whereby the subnetwork is a slice of the communication network, and whereby the subnetwork identifier is a slice identifier.

According to a second aspect, the invention relates to a communication device for communicating over a communication network. The communication device comprises a subscriber identity element according to the first aspect of the invention, whereby the subscriber identity element is configured to authenticate the communication device to the communication network. The communication device can be a UE (User Equipment).

According to a third aspect, the invention relates to a profile server for communicating with a subscriber identity element over a communication network, whereby the profile server is assigned to a subnetwork of the communication network, and whereby the subscriber identity element is configured to establish a communication link to the profile server using a subnetwork identifier of the subnetwork. The profile server comprises a communication interface which is configured to communicate with the subscriber identity element via the communication link. The profile server further comprises a processor which is configured to determine a subscriber profile of the subscriber identity element, whereby the subscriber profile is associated with the subscriber identity element. The communication interface is further configured to transmit the subscriber profile to the subscriber identity element via the communication link. The profile server can be an SMDP (Subscription Manager Data Preparation) server or an SMDP+ (Subscription Manager Data Preparation Plus) server.

According to one embodiment, the communication interface is further configured to receive a subscriber identity identifier from the subscriber identity element via the communication link, whereby the processor is further configured to determine the subscriber profile of the subscriber identity element on the basis of the subscriber identity identifier.

According to one embodiment, the profile server comprises a database, whereby the database indicates an assignment of a plurality of subscriber identity identifiers to a plurality of subscriber profiles, whereby each subscriber identity identifier is associated with a subscriber profile, and whereby the processor is further configured to compare the received subscriber identity identifier to the plurality of subscriber identity identifiers and retrieve a subscriber profile associated with the received subscriber identity identifier from the database.

According to a fourth aspect, the invention relates to a communication system for communicating over a communication network. The communication system comprises a communication device, whereby the communication device comprises a subscriber identity element in accordance with the first aspect of the invention. The communication system further comprises a profile server according to the third aspect of the invention, whereby the profile server is assigned to a subnetwork of the communication network.

According to a fifth aspect, the invention relates to a subnetwork of a communication network having a plurality of subnetworks, and a profile server according to the third aspect of the invention which is arranged in the subnetwork and is addressable via said subnetwork. The subnetwork can be a point-to-point subnetwork.

According to one embodiment, the communication network is a communication network of the fifth generation (5G) or a further generation, whereby the subnetwork is a slice of the communication network, and whereby the profile server is addressable using a subnetwork identifier of the subnetwork.

According to a sixth aspect, the invention relates to a method for the authenticating of a communication device to a communication network using a subscriber identity element, whereby the subscriber identity element comprises a memory and a communication interface, whereby the communication network comprises a subnetwork having a profile server, whereby an initialization profile of the subscriber identity element is stored in the memory, and whereby the initialization profile indicates a subnetwork identifier of the subnetwork. The method comprises establishing a communication link to the profile server using the subnetwork identifier by utilizing the communication interface and retrieving a subscriber profile from the profile server via the communication link by utilizing the communication interface. The method can be executed by the subscriber identity element. Further features of the method result directly from the features and/or functions of the subscriber identity element.

According to a seventh aspect, the invention relates to a method for communicating with a subscriber identity element over a communication network using a profile server, whereby the profile server comprises a communication interface and a processor, whereby the profile server is assigned to a subnetwork of the communication network, whereby the subscriber identity element is configured to establish a communication link to the profile server using a subnetwork identifier of the subnetwork, and whereby the communication interface is configured to communicate with the subscriber identity element via the communication link. The method comprises determining a subscriber profile of the subscriber identity element by utilizing the processor, whereby the subscriber profile is associated with the subscriber identity element, and transmitting the subscriber profile to the subscriber identity element via the communication link by utilizing the communication interface. The method can be executed by the profile server. Further features of the method result directly from the features and/or functions of the profile server.

According to an eighth aspect, the invention relates to a computer program having a program code for executing the method according to the sixth aspect of the invention or the method according to the seventh aspect of the invention when the computer program is run on a computer. The subscriber identity element and/or the profile server can be technically configured in the programming sense to run the computer program.

Exemplary embodiments of the invention can be implemented in hardware and/or in software.

FIG. 1 shows a schematic diagram of a subscriber identity element 100 for authenticating a communication device to a communication network. The communication network comprises a subnetwork having a profile server.

The subscriber identity element 100 has a memory 101 in which an initialization profile of the subscriber identity element 100 is stored, whereby the initialization profile indicates a subnetwork identifier of the subnetwork. The subscriber identity element 100 further comprises a communication interface 103 which is configured to establish a communication link to the profile server using the subnetwork identifier and to retrieve a subscriber profile from the profile server via the communication link.

Figure 2:
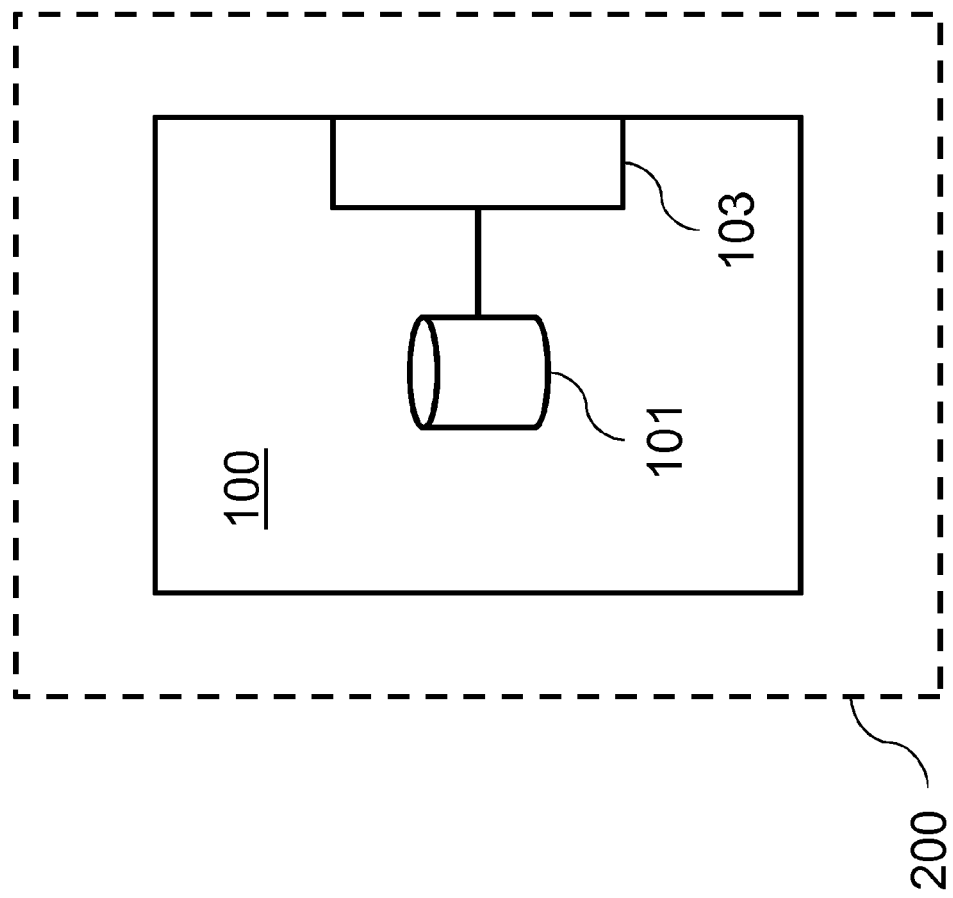
FIG. 2 is a schematic diagram of a communication device for communicating over a communication network.

FIG. 2 shows a schematic diagram of a communication device 200 for communicating over a communication network. The communication device 200 comprises a subscriber identity element 100, whereby the subscriber identity element 100 is configured to authenticate the communication device 200 to the communication network. The communication network comprises a subnetwork with a profile server.

The subscriber identity element 100 has a memory 101 in which an initialization profile of the subscriber identity element 100 is stored, whereby the initialization profile indicates a subnetwork identifier of the subnetwork. The subscriber identity element 100 further comprises a communication interface 103 configured to establish a communication link to the profile server using the subnetwork identifier and to retrieve a subscriber profile from the profile server via the communication link.

Figure 3:
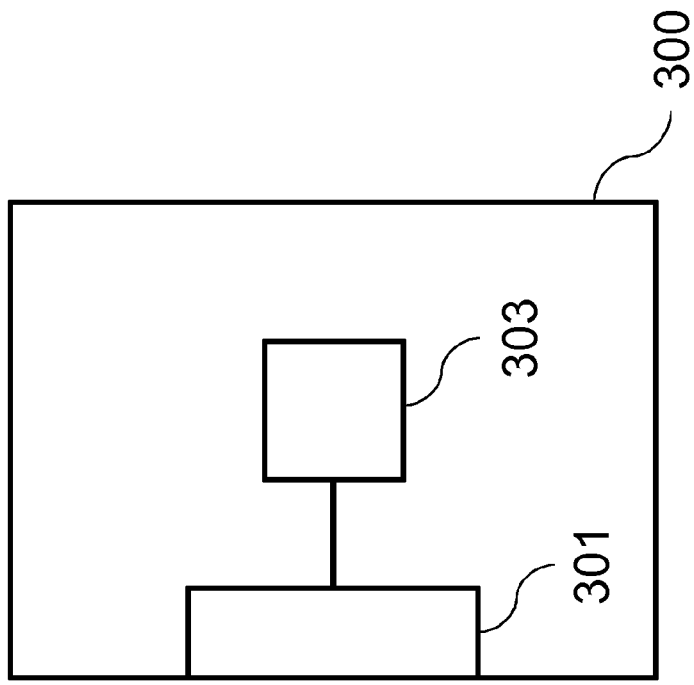
FIG. 3 is a schematic diagram of a profile server for communicating with a subscriber identity element over a communication network.

FIG. 3 shows a schematic diagram of a profile server 300 for communicating with a subscriber identity element over a communication network. The profile server 300 is assigned to a subnetwork of the communication network. The subscriber identity element is configured to establish a communication link to the profile server 300 using a subnetwork identifier of the subnetwork.

The profile server 300 comprises a communication interface 301 which is configured to communicate with the subscriber identity element via the communication link. The profile server 300 further comprises a processor 303 which is configured to determine a subscriber profile of the subscriber identity element, whereby the subscriber profile is associated with subscriber identity element. The communication interface 301 is further configured to transmit the subscriber profile to the subscriber identity element via the communication link.

Figure 4:
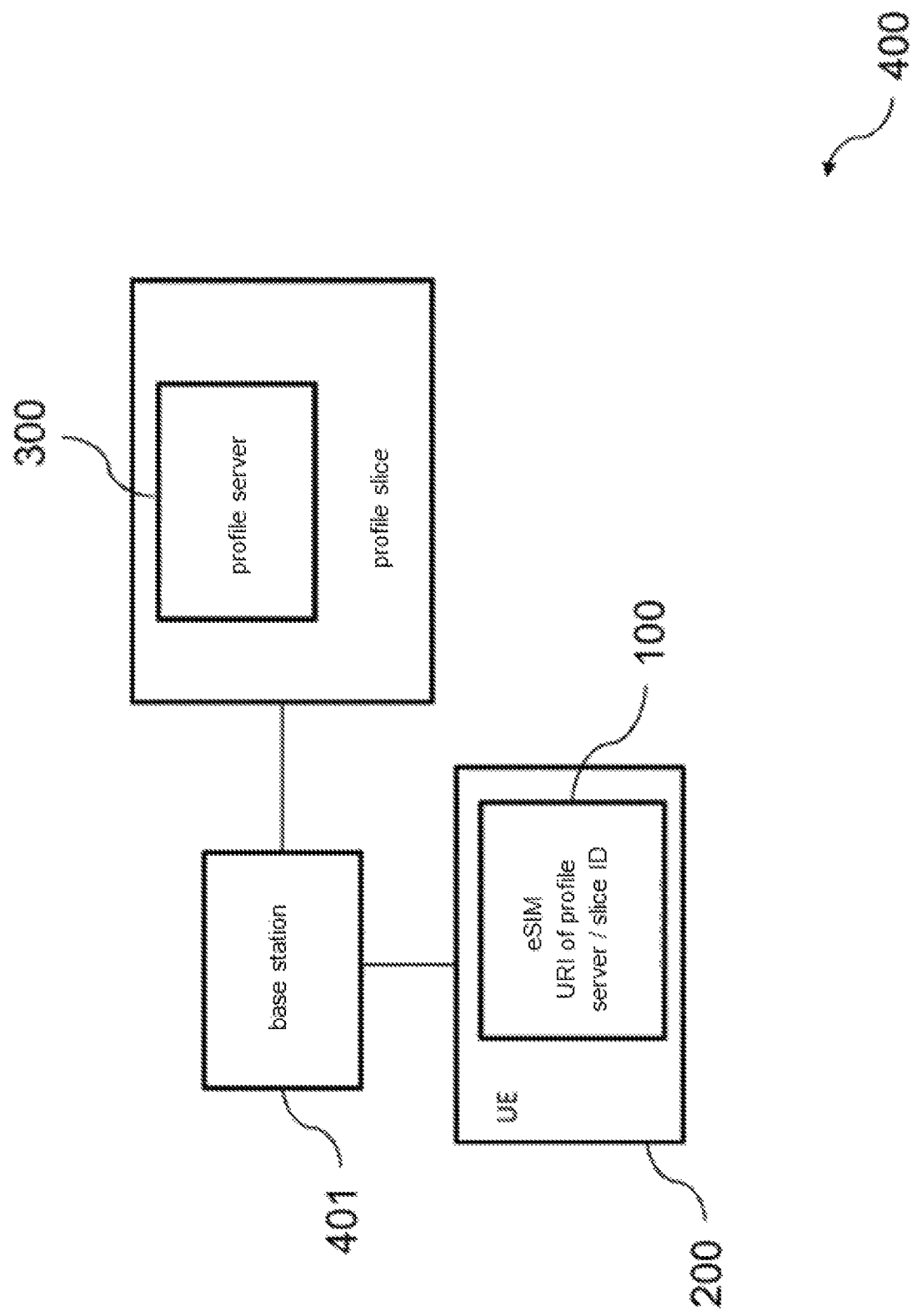
FIG. 4 is a schematic diagram of a communication system for communicating over a communication network.

FIG. 4 shows a schematic diagram of a communication system 400 for communicating over a communication network.

The communication system 400 comprises a communication device 200, whereby the communication device 200 comprises a subscriber identity element 100. The communication system 400 further comprises a profile server 300, whereby the profile server 300 is assigned to a subnetwork of the communication network. The communication between the subscriber identity element 100 and the profile server 300 ensues via a base station 401 of the communication network.

The subnetwork comprises the profile server 300 which is arranged in the subnetwork and is addressable via the subnetwork. The subnetwork can be a slice or a profile slice of the communication network.

For the initializing or activating of the subscriber identity element 100, for example an eSIM, a subscriber profile which can be downloaded from the profile server 300, for example an SMDP+ server, is used. If the profile server 300 is known, for example its profile server identifier knows the subscriber identity element 100, the profile server 300 can be directed contacted using the profile server identifier, for example a URI. The providing of a profile service is desirable, particularly for communication networks of the fifth generation (5G) and further generations.

Instead of an isolated profile server 300, a subnetwork of the communication network can be provided with the profile server 300. One embodiment makes use of a slice, e.g. a profile slice, is used in which subscriber profiles of subscriber identity elements can be managed.

For retrieving a subscriber profile, a subnetwork identifier, for example a slice identifier, of the subnetwork can be known to the subscriber identity element 100. This can be integrated in an initialization profile, e.g. a bootstrap profile. When logging into the communication network, the base station 401 can route the communication device 200 to the subnetwork, e.g. the profile slice. One or more profile servers can be provided in the subnetwork. The subnetwork routing can ensue via the subnetwork identifier which is for example stored in the initialization profile.

The subnetwork, e.g. the slice, can be managed more easily than decentrally arranged profile servers. Additionally, only the subnetwork identifier, e.g. the slice identifier, can be used for initially logging into the communication device 200. This thereby further increases the system security since the profile server can be hidden in the subnetwork, in particular the slice. This can for example be implemented by utilizing a proxy server.

Furthermore, a further network instance can be upstream of the profile server 300 in the subnetwork, e.g. the slice, in order to prevent direct communication between the communication device 200 and the profile server 300 or to prevent roaming of the communication device 200 if the communication device 200 is in a foreign country.

Figure 5:
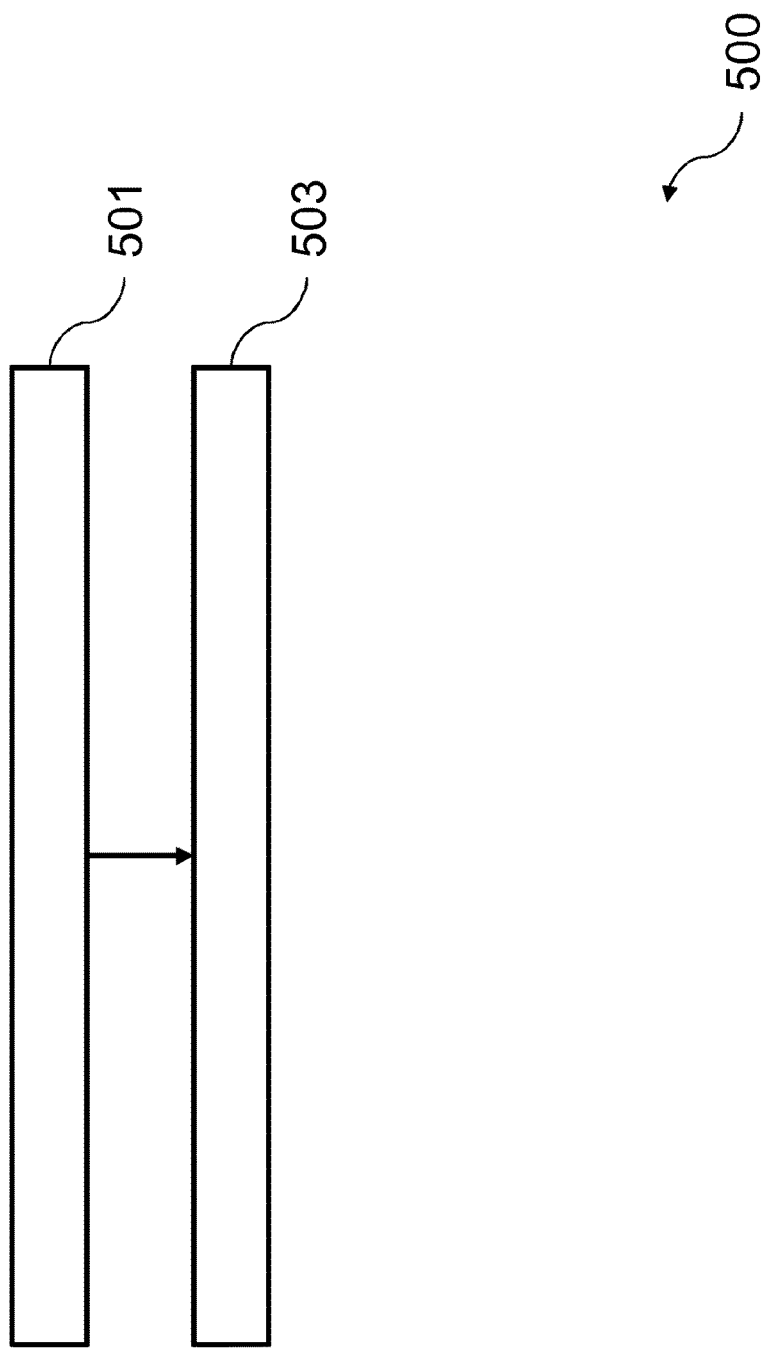
FIG. 5 is a schematic diagram of a method for authenticating a communication device to a communication network using a subscriber identity element.

FIG. 5 shows a schematic diagram of a method 500 for authenticating a communication device to a communication network using a subscriber identity element. The subscriber identity element has a memory and a communication interface. The communication network comprises a subnetwork with a profile server. An initialization profile of the subscriber identity element is stored in the memory, whereby the initialization profile indicates a subnetwork identifier of the subnetwork.

The method 500 comprises establishing 501 a communication link to the profile server via the communication interface using the subnetwork identifier and retrieving 503 a subscriber profile from the profile server over the communication link via the communication interface.

Figure 6:
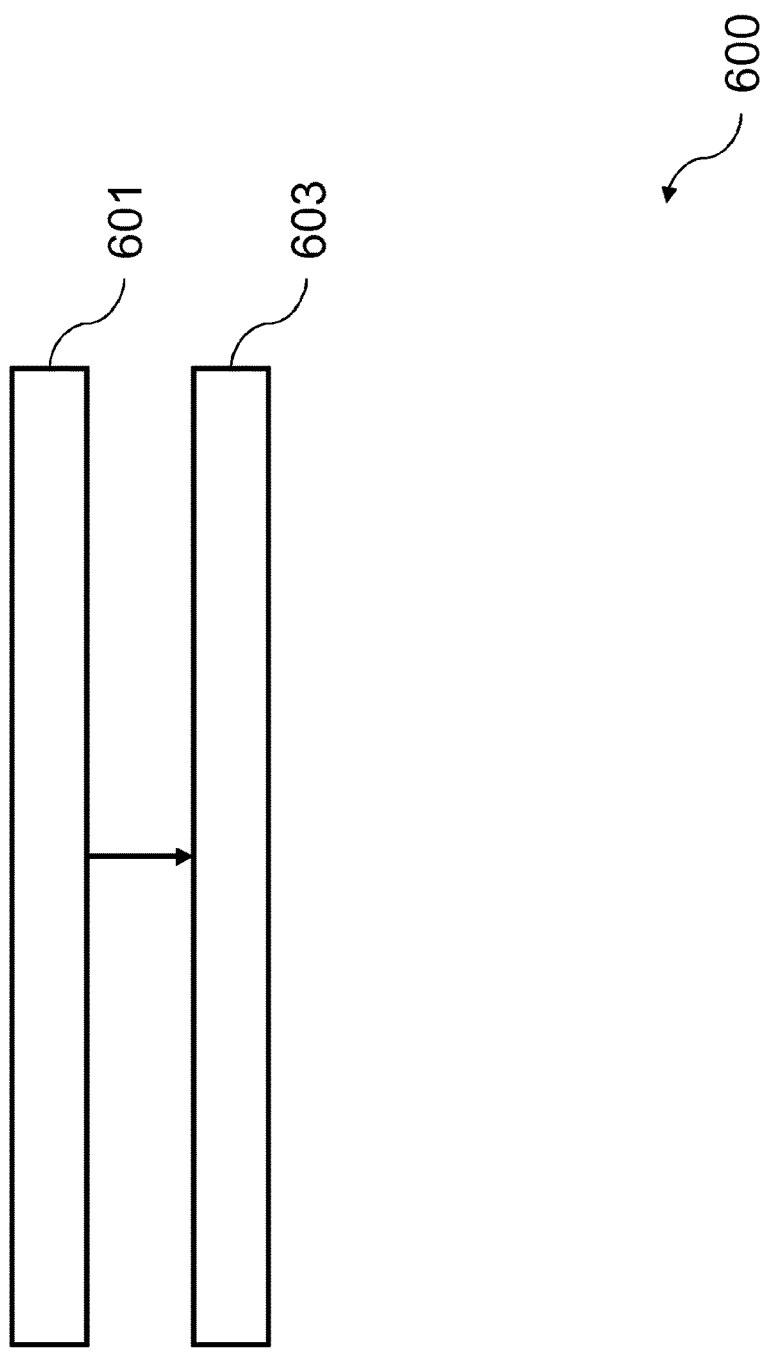
FIG. 6 is a schematic diagram of a method for communicating with a subscriber identity element over a communication network using a profile server.

FIG. 6 shows a schematic diagram of a method 600 for communicating with a subscriber identity element over a communication network using a profile server. The profile server comprises a communication interface and a processor. The profile server is associated with a subnetwork of the communication network. The subscriber identity element is configured to establish a communication link to the profile server using a subnetwork identifier of the subnetwork. The communication interface is configured to communicate with the subscriber identity element via the communication link.

The method 600 comprises determining 601 a subscriber profile of the subscriber identity element by utilizing the processor, whereby the subscriber profile is associated with the subscriber identity element, and transmitting 603 the subscriber profile to the subscriber identity element over the communication link via the communication interface.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 100 subscriber identity element
101 memory
103 communication interface
200 communication device
300 profile server
301 communication interface
303 processor
400 communication system
401 base station
500 authentication method
501 establishing
503 retrieving
600 communication method
601 determining
603 transmitting

The invention claimed is:

1. A subscriber identity element for authenticating a communication device to a communication network, wherein the communication network comprises a subnetwork having a profile server, wherein the subscriber identity element comprises:
a memory in which an initialization profile of the subscriber identity element) is stored, wherein the initialization profile indicates a subnetwork identifier of the subnetwork; and
a communication interface, configured to establish a communication link to the profile server using the subnetwork identifier and to retrieve a subscriber profile from the profile server via the communication link.

2. The subscriber identity element according to claim 1, wherein the profile server is assigned a profile server identifier, wherein the initialization profile further indicates the profile server identifier, and wherein the communication interface is further configured to establish the communication link to the profile server using the profile server identifier.

3. The subscriber identity element according to claim 2, wherein the profile server identifier is a Uniform Resource Identifier (URI) of the profile server.

4. The subscriber identity element according to claim 1, wherein the subscriber identity element is assigned a subscriber identity identifier, and wherein the communication interface is configured to transmit the subscriber identity identifier to the profile server via the communication link.

5. The subscriber identity element according to claim 1, wherein the memory is configured to store the subscriber profile.

6. The subscriber identity element according to claim 1, wherein the communication interface is further configured to establish a communication link to the profile server upon an initial initialization of the subscriber identity element.

7. The subscriber identity element according to claim 1, wherein the communication network is a communication network of the fifth generation (5G) or a further generation, wherein the subnetwork is a slice of the communication network, and wherein the subnetwork identifier is a slice identifier.

8. The subscriber identity element according to claim 1, wherein the subscriber identity element is part of a communication device and is configured to authenticate the communication device to a communication network.

9. A profile server for communicating with a subscriber identity element over a communication network, wherein the profile server is assigned to a subnetwork of the communication network, wherein the profile server comprises:
a communication interface, configured to communicate with the subscriber identity element via a communication link established between the subscriber identity element and the profile server using a subnetwork identifier of the subnetwork; and
a processor, configured to determine a subscriber profile of the subscriber identity element, wherein the subscriber profile is associated with the subscriber identity element;
wherein the communication interface is further configured to transmit the subscriber profile to the subscriber identity element via the communication link.

10. The profile server according to claim 9, wherein the communication interface is further configured to receive a subscriber identity identifier from the subscriber identity element via the communication link, and wherein the processor is further configured to determine the subscriber profile of the subscriber identity element on the basis of the subscriber identity identifier.

11. The profile server according claim 10, wherein the profile server further comprises a database, wherein the database indicates an assignment of a plurality of subscriber identity identifiers to a plurality of subscriber profiles, wherein each subscriber identity identifier is associated with a subscriber profile, and wherein the processor is further configured to compare the received subscriber identity identifier to the plurality of subscriber identity identifiers and retrieve a subscriber profile associated with the received subscriber identity identifier from the database.

12. The profile server according to claim 9, wherein the profile server is arranged in a subnetwork of the communication network and is addressable via the subnetwork.

13. A method for authenticating a communication device to a communication network using a subscriber identity element, wherein the subscriber identity element has a memory and a communication interface, wherein the communication network comprises a subnetwork with a profile server, wherein an initialization profile of the subscriber identity element is stored in the memory, and wherein the initialization profile indicates a subnetwork identifier of the subnetwork, wherein the method comprises:

establishing a communication link to the profile server using the subnetwork identifier by utilizing the communication interface; and retrieving a subscriber profile from the profile server via the communication link by utilizing the communication interface.

14. A method for communicating with a subscriber identity element over a communication network using a profile server, wherein the profile server comprises a communication interface and a processor, wherein the profile server is assigned to a subnetwork of the communication network, and wherein the method comprises:

communicating, by the profile server, with the subscriber identity element via a communication link established between the subscriber identity element and the profile server using a subnetwork identifier of the subnetwork;

determining, by the profile server, a subscriber profile of the subscriber identity element by utilizing the processor, wherein the subscriber profile is associated with the subscriber identity element; and transmitting, by the profile server, the subscriber profile to the subscriber identity element via the communication link by utilizing the communication interface.

15. A non-transitory computer-readable medium having a program code for executing the method according to claim 13 when the computer program is run on a computer.

16. A non-transitory computer-readable medium having a program code for executing the method according to claim 14 when the computer program is run on a computer.

\* \* \* \* \*